United States Patent [19]
Thurman et al.

[11] Patent Number: 5,379,554
[45] Date of Patent: Jan. 10, 1995

[54] GRINDING AND FINISHING WORM

[75] Inventors: Dan L. Thurman, Peoria; Michael L. Gilham, Morton; John C. Lee, Peoria, all of Ill.

[73] Assignee: Caterpillar Inc., Peoria, Ill.

[21] Appl. No.: 259,732

[22] Filed: Jun. 1, 1994

Related U.S. Application Data

[63] Continuation of Ser. No. 18,833, Feb. 18, 1993, abandoned.

[51] Int. Cl.$^6$ ............................................. B24D 17/00
[52] U.S. Cl. .................................... 451/177; 451/47; 451/253
[58] Field of Search .......... 51/105 GG, 206 R, 206 P, 51/206 NF, 287, 95 GH

[56] References Cited

U.S. PATENT DOCUMENTS

| | | | |
|---|---|---|---|
| 1,877,104 | 9/1932 | Wildhaber | 51/206 P |
| 2,077,100 | 4/1937 | Edgar | 51/206 P |
| 2,607,175 | 8/1952 | Osplack | 51/287 |
| 3,740,904 | 6/1973 | Ainoura | 51/287 |
| 3,897,661 | 8/1975 | Inatomi et al. | 51/287 |
| 4,299,062 | 11/1981 | Junker | 51/287 |
| 4,841,676 | 6/1989 | Barwasser | 51/181 R |
| 4,961,289 | 10/1990 | Sulzer | 51/105 GG |

OTHER PUBLICATIONS

Article entitled "The LCS-Process from Liebherr" The new and proficient solution for fine-finishing of hardened gears. Published Oct. 22, 1987, pp. 1–12. (7. EMO Milano).

*Primary Examiner*—Jack W. Lavinder
*Attorney, Agent, or Firm*—Kenneth A. Rhoads

[57] ABSTRACT

The invention relates to an apparatus of unitary construction to fine-finish gear teeth. The apparatus is a worm having first and second end portions and first and second outer surfaces. The first and second surfaces define a common tooth profile. The first end portion is adapted for grinding and the second end portion is adapted for finishing.

7 Claims, 2 Drawing Sheets

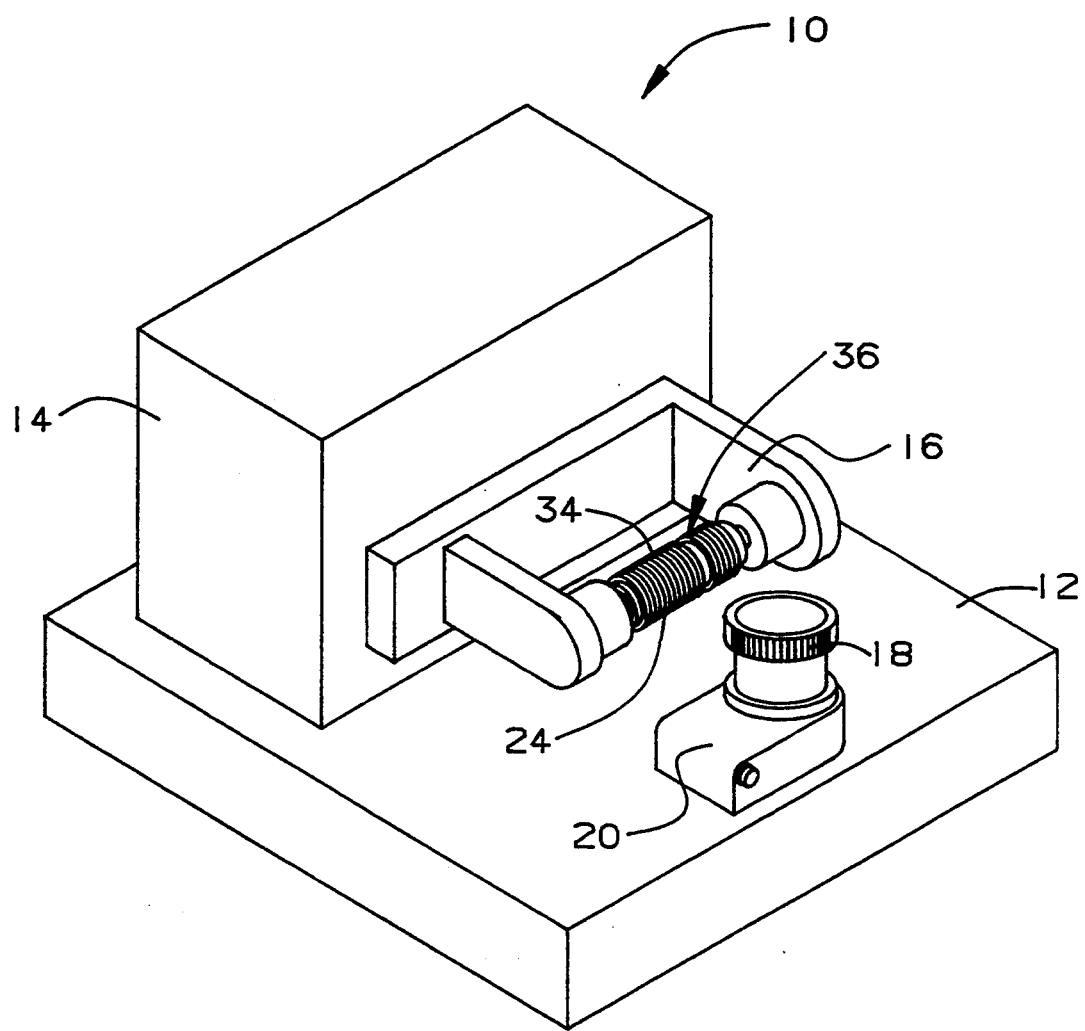

U.S. Patent Jan. 10, 1995 Sheet 2 of 2 5,379,554
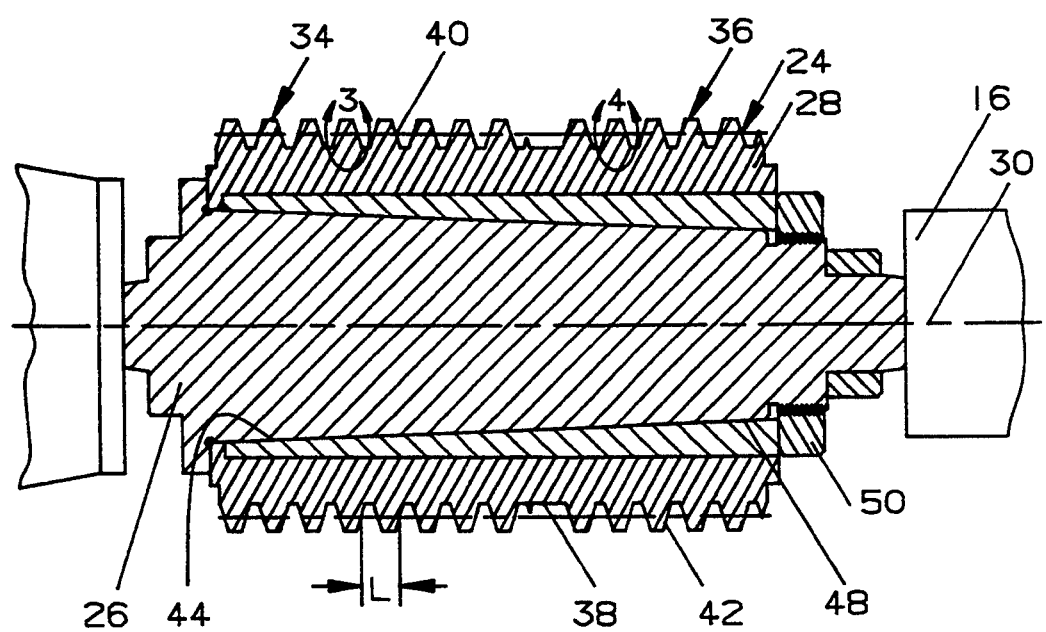
Fig_2_
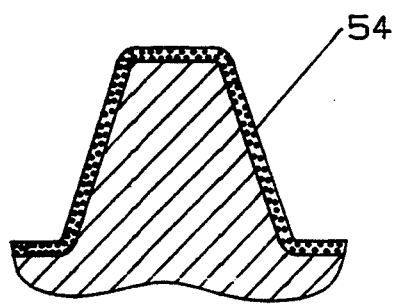
Fig_3_
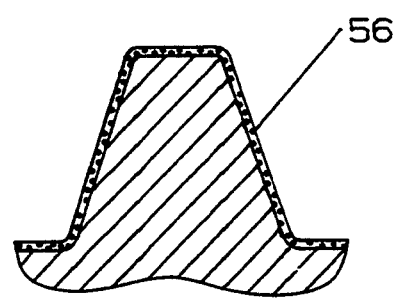
Fig_4_

GRINDING AND FINISHING WORM

This is a file wrapper continuation of application Ser. No. 08/018,833, filed Feb. 18, 1993, now abandoned.

TECHNICAL FIELD

This invention relates generally to an apparatus for grinding and finishing a metal member. More specifically, the invention relates to a unitary worm for precision grinding and finishing of gear teeth or the like.

BACKGROUND ART

Gear teeth are typically formed by hobbing or shaping which produces finite machining marks and slight deviations from the desired involute profile due to inherent manufacturing tolerances. If the gear tooth surfaces are not ground and finished to remove these imperfections, they will have a detrimental effect on the meshing action with mating gears, undesirable high noise levels, excessive stress, and early failure.

U.S. Pat. No. 4,961,289 issued on Oct. 9, 1990 to Gerd Sulzer discloses a two body worm to fine-finish the surfaces of gear teeth. The two body worm includes a rough grinding body coated with a carbide coating and a polishing body made of an elastic synthetic material. The two bodies are then mounted on a single arbor for use in a gear grinding machine. It is imperative that the helical surfaces or spiral path of the two bodies be continuous without interruption. Any deviation will result in the gear surfaces being out of tolerance. Undesirably, setting and maintaining the two worm bodies in proper alignment is very difficult and time consuming.

Thus, what is needed is an apparatus of unitary construction for grinding and finishing gear tooth surfaces that requires no critical alignment, is highly accurate, is of unitary construction in order to entirely eliminate misalignment during operation, and has short machining times with economical processing cost.

The present invention is directed to overcome one or more of the problems as set forth above.

DISCLOSURE OF THE INVENTION

In one aspect of the invention, an apparatus for grinding and finishing a metal member is of unitary construction. The apparatus is a worm having an axis, first and second end portions, a middle portion, and first and second outer surfaces. The first and second outer surfaces each define a common preselected tooth profile and a common preselected lead. The middle portion is free of said tooth profile over a preselected distance as measured along the axis. The first end portion is adapted for grinding and the other end portion is adapted for finishing.

BRIEF DESCRIPTION OF THE DRAWINGS

FIG. 1 is a diagrammatic view of a hob grinding machine incorporating the subject invention;

FIG. 2 is a diagrammatic cross-sectional view of a tool arbor with the apparatus of this invention;

FIG. 3 is a diagrammatic enlarged view of a portion of the apparatus taken within partial section 3 of FIG. 2; and FIG. 4 is a diagrammatic enlarged view of a portion of the apparatus taken within partial section 4 of FIG. 2.

BEST MODE FOR CARRYING OUT THE INVENTION

Referring to FIGS. 1 and 2, a machine 10 for fine-finishing helical gearing and the like is schematically illustrated. The machine 10, which is of conventional construction, includes a machine bed 12, a slidable upright column 14 and a rockable feed carriage 16 mounted on the column. A pretoothed gear 18 is clamped on the bed 12 with an appropriate clamping means 20. An apparatus 24 for grinding and finishing the gear 18 is rotatably supported on a quick-change clamping arbor 26 of the feed carriage 16. The feed carriage 16 imparts a working stroke to the apparatus 24 with respect to the gear 18 in a conventional manner.

As best shown in FIG. 2, the apparatus 24 includes an unitary composite grinding and finishing, generally cylindrical, worm 28 having an axis 30, first and second end portions 34,36, a middle portion 38, and first and second outer surfaces 40,42. The worm 28 has an internal peripheral surface 44 defining a tapered bore 46. The internal peripheral surface 44 mates with an outer peripheral surface 48 of the arbor 26 where the worm 28 is retained by a nut 50.

The first and second outer surfaces 40,42 each define a preselected tooth profile, and a common preselected lead "L". It is recognized that the first and second end portions 34,36 may have different tooth profiles. The middle portion 38 is free of the tooth profile over a preselected distance equal to the preselected lead "L" as measured along the axis 30.

As shown in FIG. 3, the tooth profile of the first portion 34 has a first portion coating 54 preferable of cubic boron nitride (CBN), for example. As shown in FIG. 4, the tooth profile of the second portion 36 has a second portion coating 56 preferably of cubic boron nitride (CBN), for example. The CBN coatings 54,56 are preferably of different grit. One of the first and second end portions 34,36 is adapted for grinding and the other end portion being adapted for finishing. Preferably the first end portion 34 is for grinding. The preselected tooth profile of the first and second end portions 34,36 preferably varies along their axial length in order to effect corresponding tooth profile corrections. It is recognized, for example, that the coating for the first and second portions could be a silicon carbide, or a tungsten carbide, or a fused alumina or any combination thereof. The coatings 54,56 can be selected such that the abrading particles can fracture in order to remain sharp and thus alleviating the need for redressing of the end portions 34,36.

INDUSTRIAL APPLICABILITY

The unitary construction of the worm 28 insures a continuous common lead between the first and second portions 34,36 without any need for time consuming alignment and maintenance. The first and second outer surfaces 40,42 have substantially identical tooth profiles and their spiral extends along a common helical line eliminating any tolerance deviation.

The middle portion 38 is free of the tooth profile for a peripheral distance equal to the lead of the helix effectively removing an equal volume of material around the circumference of the worm 28, thus maintaining the dynamic balance of the worm.

We claim:

1. An apparatus for grinding and finishing a metal member, comprising:

a single unitary composite grinding and finishing worm having an axis, first and second end portions, a middle portion, and first and second outer surfaces, said first and second outer surfaces each defining a preselected tooth profile, a continuous common preselected lead, said middle portion being free of said tooth profile over a preselected distance as measured along the axis, said preselected distance being substantially equal to lead dimension of said first and second end portions; and one of said end portions being adapted for grinding and the other end portion being adapted for finishing.

2. An apparatus, as set forth in claim 1, including means for connecting the worm to a rotating arbor.

3. An apparatus, as set forth in claim 1, wherein the first portion has a first portion coating of cubic boron nitride (CBN) and the second portion has a second portion coating of cubic boron nitride (CBN).

4. An apparatus as set forth in claim 1, wherein the first portion has a first portion coating and the second portion has a second portion coating, said first and second coatings are cubic boron nitride (CBN), or silicon carbide, or tungsten carbide, or fused alumina, or any combination thereof.

5. An apparatus, as set forth in claim 4, wherein the coatings can be selected such that the abrading particles can fracture in order to remain sharp and thus alleviating the need for redressing of the end portions.

6. An apparatus, as set forth in claim 1, wherein the first and second end portions have different tooth profiles.

7. An apparatus, as set forth in claim 1 wherein the preselected tooth profile of the first and second end portions varies along the axial length of the first and second end portions.

* * * * *